(12) United States Patent
Hasegawa et al.

(10) Patent No.: US 11,424,589 B2
(45) Date of Patent: Aug. 23, 2022

(54) OPTICAL FIBER LASER DEVICE

(71) Applicants: TOYOTA JIDOSHA KABUSHIKI KAISHA, Toyota (JP); Toyota School Foundation, Nagoya (JP)

(72) Inventors: Kazuo Hasegawa, Nagakute (JP); Daisuke Inoue, Nagakute (JP); Satoru Kato, Nagakute (JP); Tomoya Okazaki, Nagakute (JP); Kazuya Saito, Nagoya (JP); Arindam Halder, Nagoya (JP)

(73) Assignees: TOYOTA JIDOSHA KABUSHIKI KAISHA, Toyota (JP); Toyota School Foundation, Nagoya (JP)

( * ) Notice: Subject to any disclaimer, the term of this patent is extended or adjusted under 35 U.S.C. 154(b) by 256 days.

(21) Appl. No.: 16/865,478

(22) Filed: May 4, 2020

(65) Prior Publication Data
US 2020/0358245 A1 Nov. 12, 2020

(30) Foreign Application Priority Data
May 7, 2019 (JP) .............................. JP2019-087569

(51) Int. Cl.
*H01S 3/30* (2006.01)
*H01S 3/067* (2006.01)
*H01S 3/16* (2006.01)
*H01S 3/08* (2006.01)

(52) U.S. Cl.
CPC ........ *H01S 3/06716* (2013.01); *H01S 3/0675* (2013.01); *H01S 3/06729* (2013.01); *H01S 3/08045* (2013.01); *H01S 3/1698* (2013.01); *H01S 3/06754* (2013.01); *H01S 3/1618* (2013.01)

(58) Field of Classification Search
CPC .. H01S 3/1698; H01S 3/06716; H01S 3/0675; H01S 3/08045; H01S 3/06729; H01S 3/1618
See application file for complete search history.

(56) References Cited

U.S. PATENT DOCUMENTS 5,121,460 A 6/1992 Tumminelli et al.
5,530,710 A * 6/1996 Grubb ................. H01S 3/06754
385/127

(Continued)

FOREIGN PATENT DOCUMENTS

JP 7-211980 A 8/1995
JP 8-330651 A 12/1996

(Continued)

OTHER PUBLICATIONS

Japanese Office Action dated Dec. 1, 2020 in Japanese Patent Application No. 2019-087569 (submitting partial English translation only), 4 pages.

*Primary Examiner* — Kinam Park
(74) *Attorney, Agent, or Firm* — Oblon, McClelland, Maier & Neustadt, L.L.P.

(57) ABSTRACT

A first fiber is connected to a first end of a third fiber doped with a rare earth element, and a second fiber is connected to a second end of the third fiber. In the third fiber doped with the rare earth element, a central portion of a core is more heavily doped with the rare earth element than a peripheral portion of the core is.

6 Claims, 16 Drawing Sheets

(56) References Cited

U.S. PATENT DOCUMENTS

| | | | |
|---|---|---|---|
| 8,204,349 B2* | 6/2012 | Gapontsev | G02B 6/02023 |
| | | | 385/127 |
| 2008/0144673 A1 | 6/2008 | Gapontsev | |
| 2009/0316733 A1* | 12/2009 | Yao | H01S 3/0675 |
| | | | 372/6 |
| 2010/0284428 A1* | 11/2010 | Furuya | H01S 3/0675 |
| | | | 372/6 |
| 2010/0303103 A1* | 12/2010 | Shima | H01S 3/0675 |
| | | | 372/6 |
| 2011/0097049 A1 | 4/2011 | Gapontsev et al. | |
| 2011/0188825 A1 | 8/2011 | Alkeskjold | |
| 2011/0222827 A1 | 9/2011 | Sugawara | |
| 2015/0036703 A1* | 2/2015 | Dong | G02B 6/02366 |
| | | | 359/341.3 |
| 2015/0280388 A1* | 10/2015 | Kashiwagi | G02B 6/024 |
| | | | 359/341.32 |
| 2016/0043525 A1* | 2/2016 | Ichige | H01S 3/0675 |
| | | | 359/341.1 |

FOREIGN PATENT DOCUMENTS

| | | |
|---|---|---|
| JP | 2007-273600 A | 10/2007 |
| JP | 2010-167433 A | 8/2010 |
| JP | 2014-179404 A | 9/2014 |
| JP | 2017-157757 A | 9/2017 |
| JP | 2018-121033 A | 8/2018 |
| WO | WO 91/13038 A1 | 9/1991 |
| WO | WO 03/067723 A1 | 8/2003 |

* cited by examiner

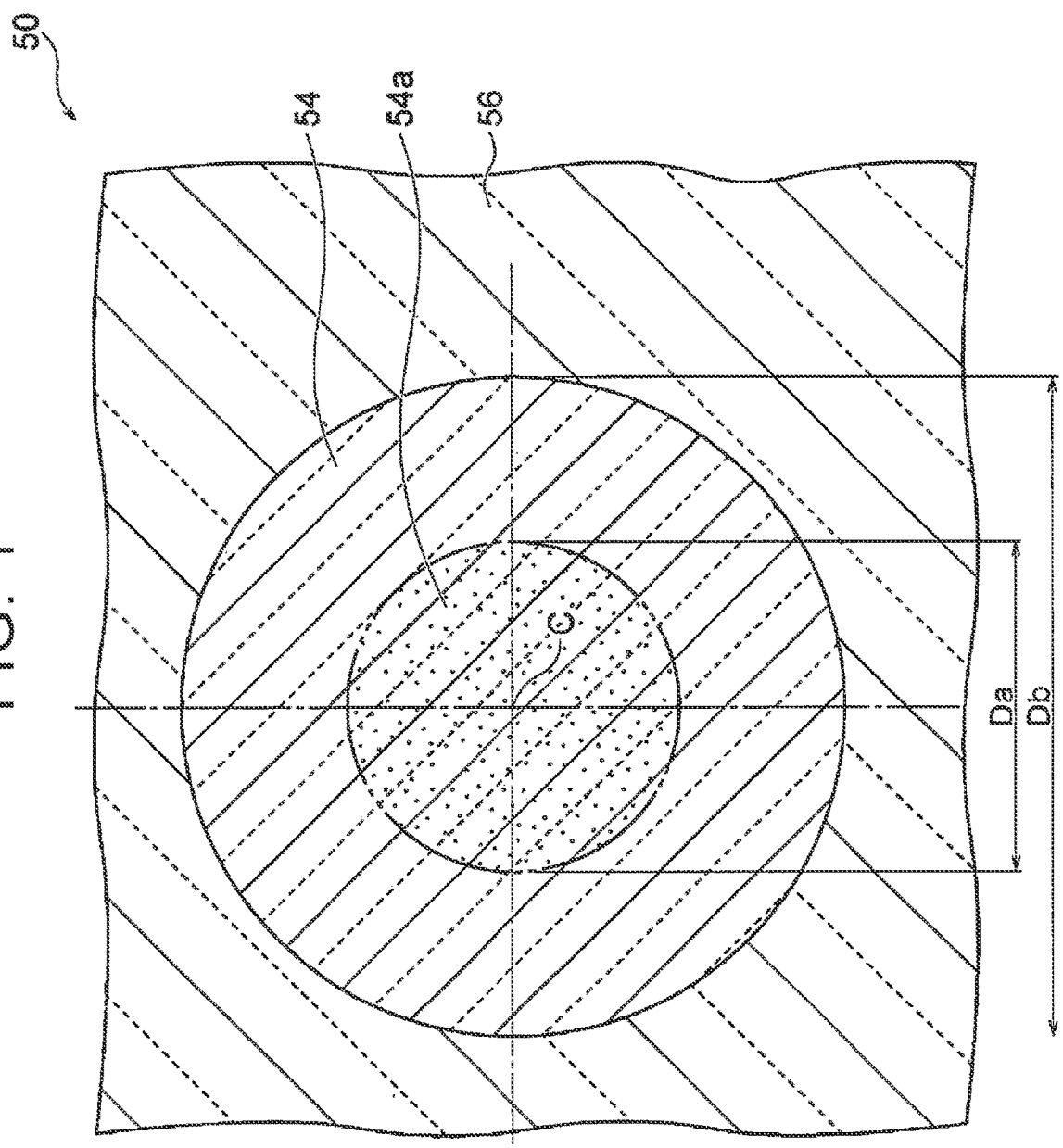

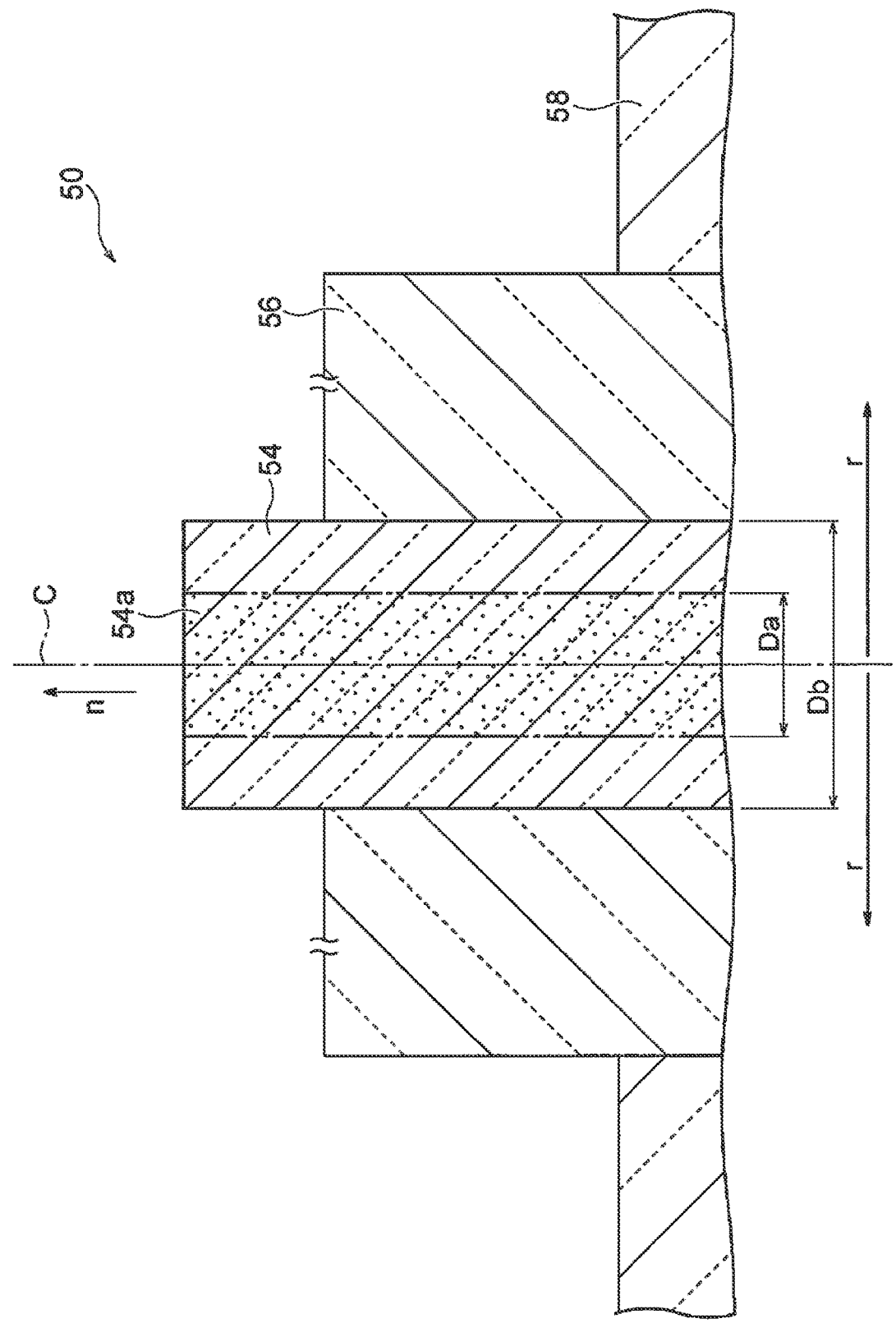

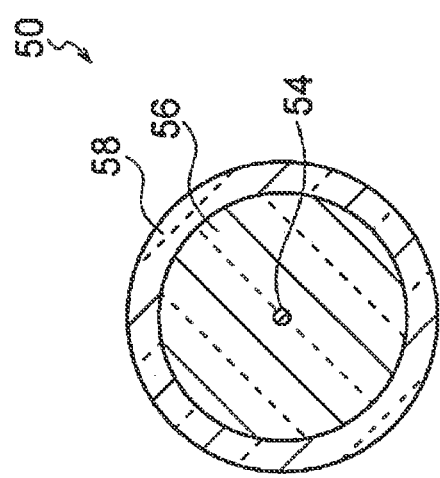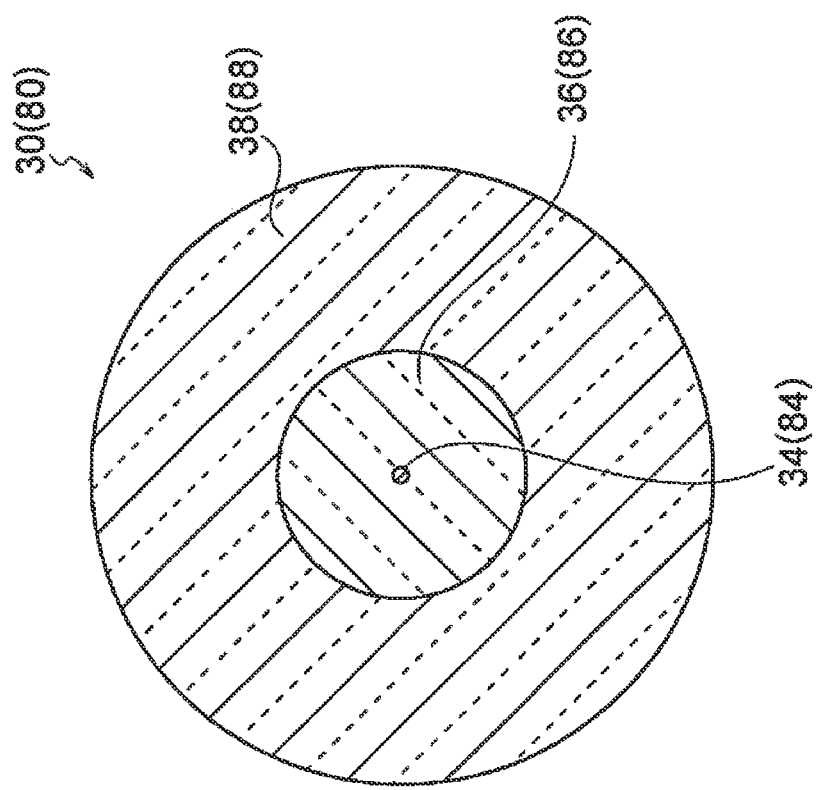

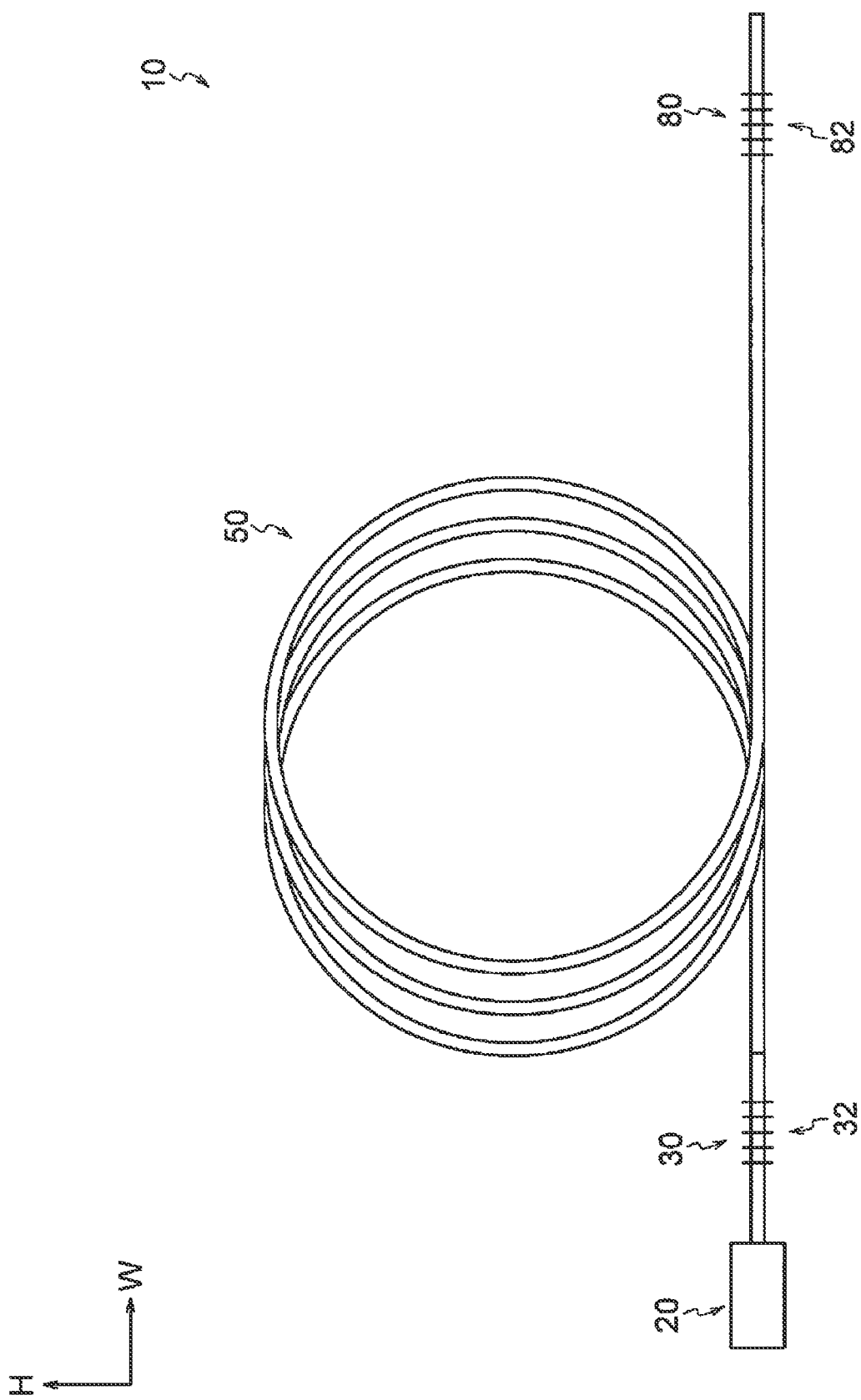

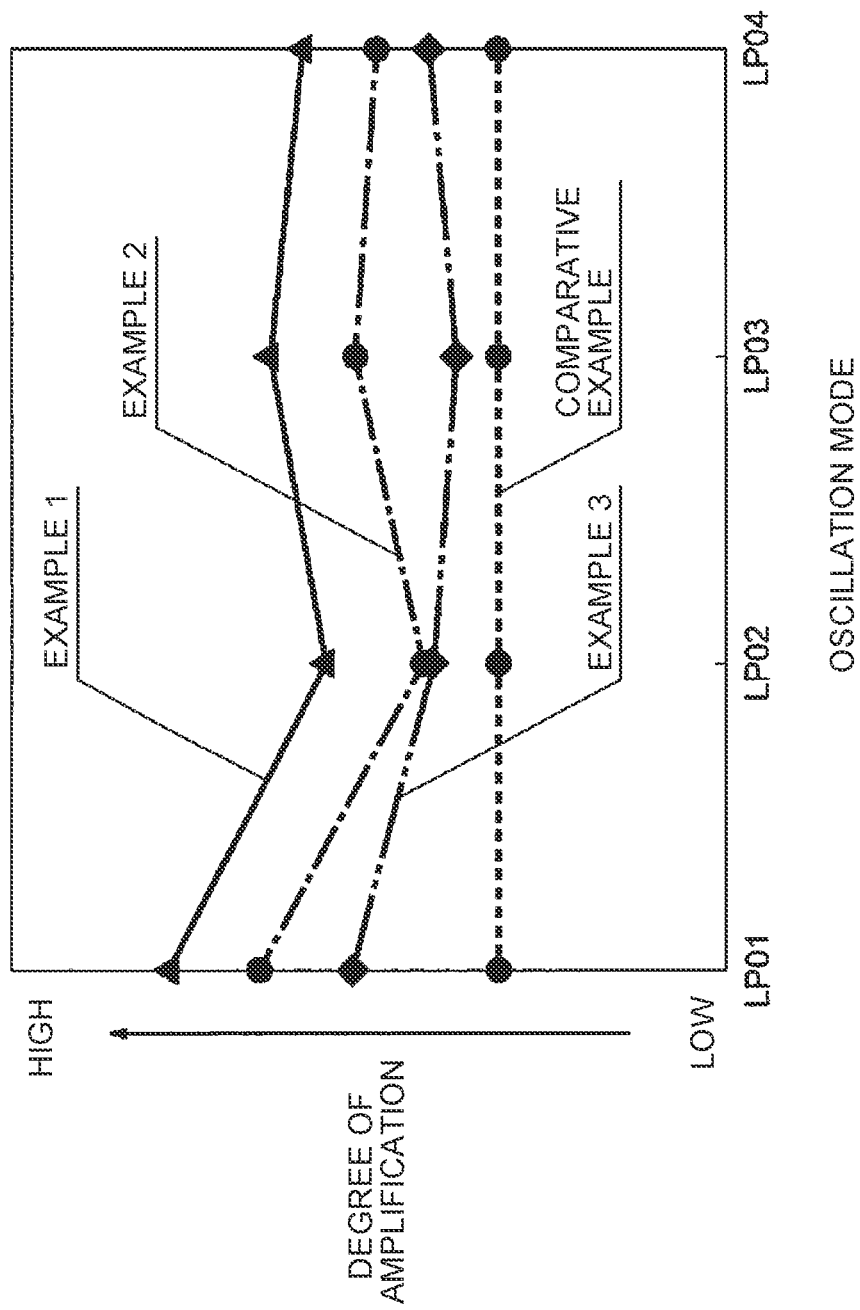

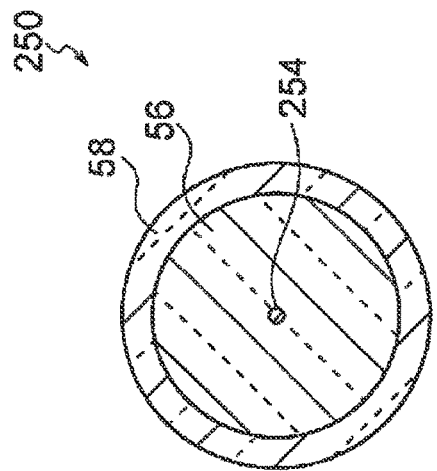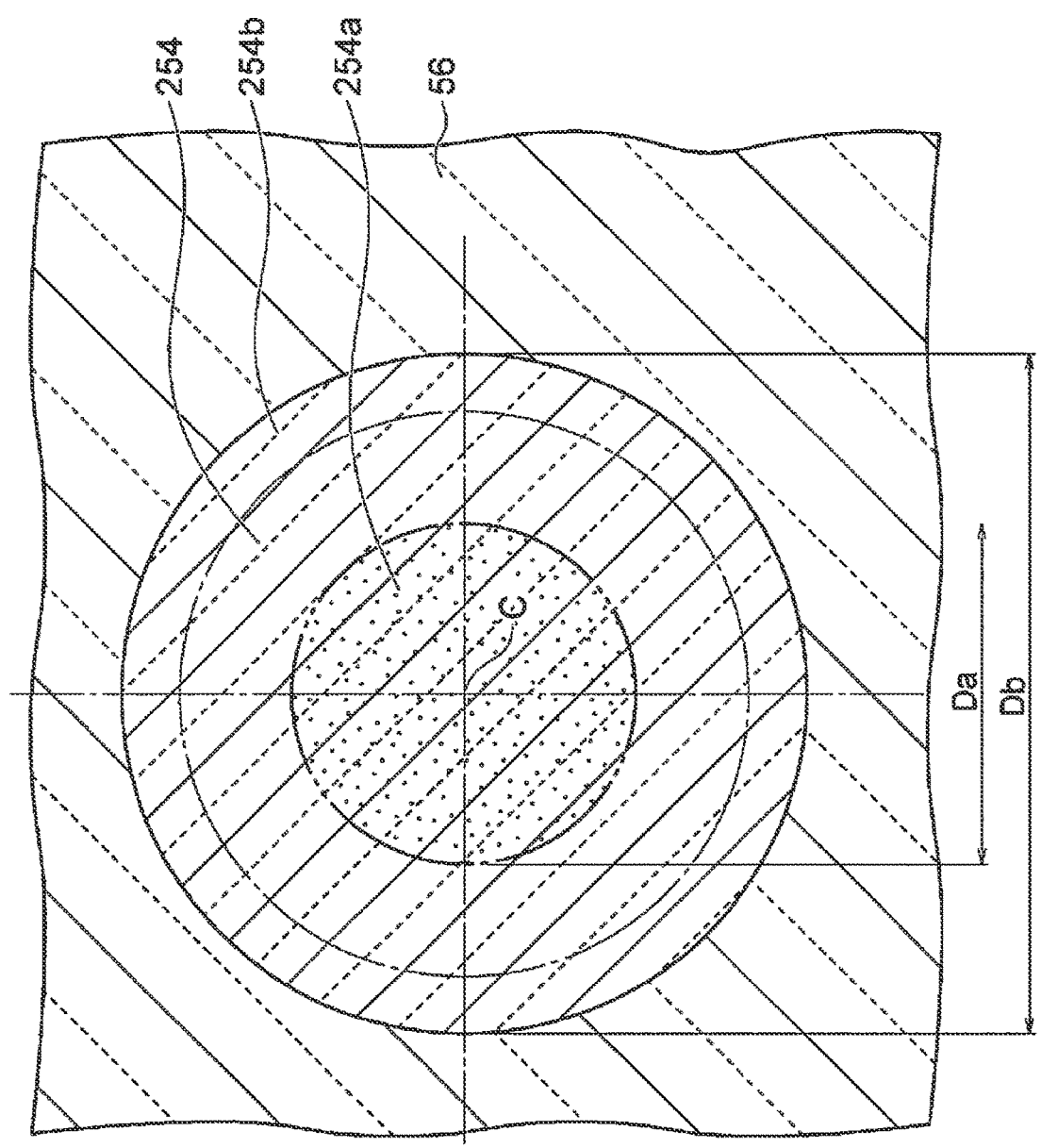

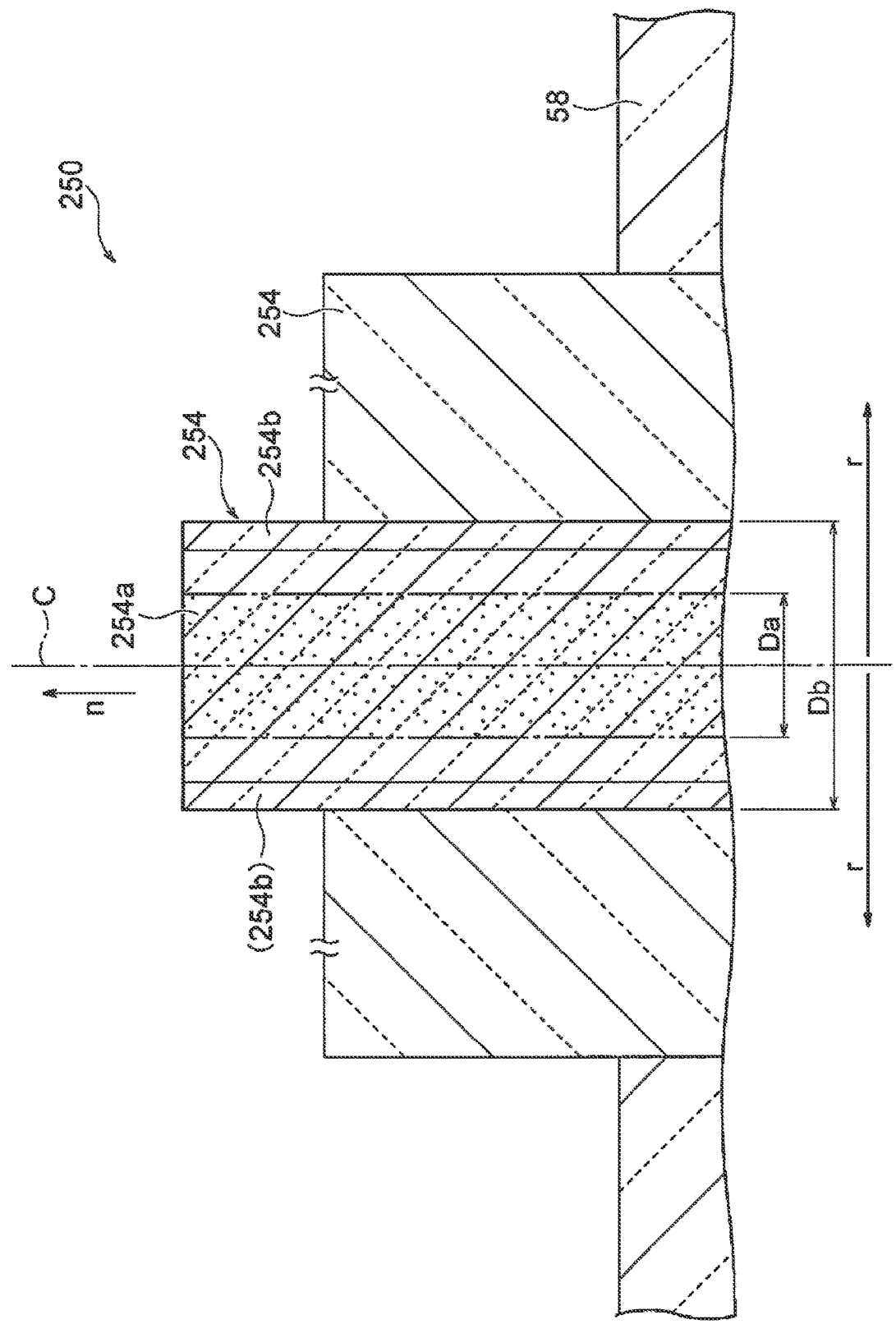

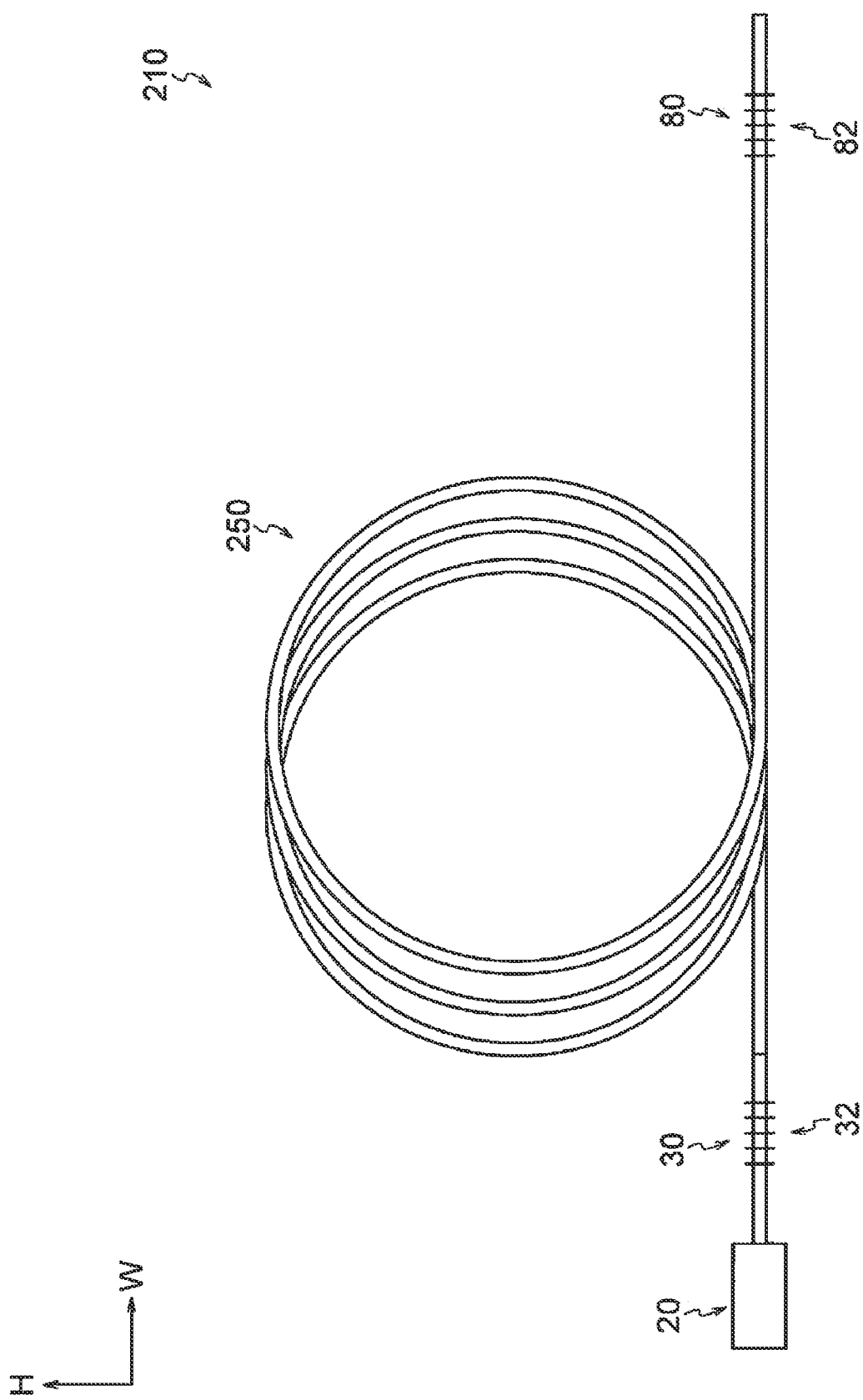

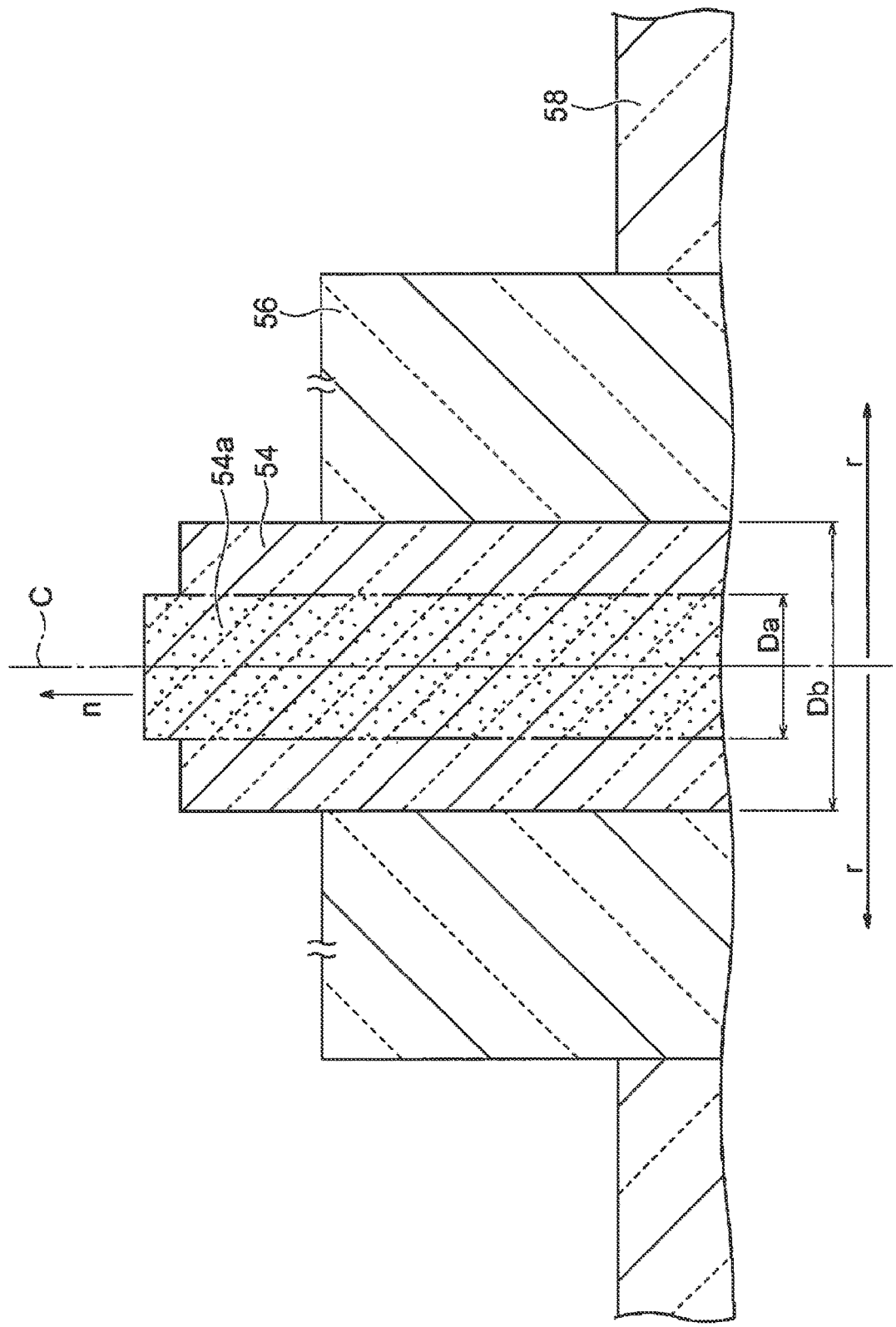

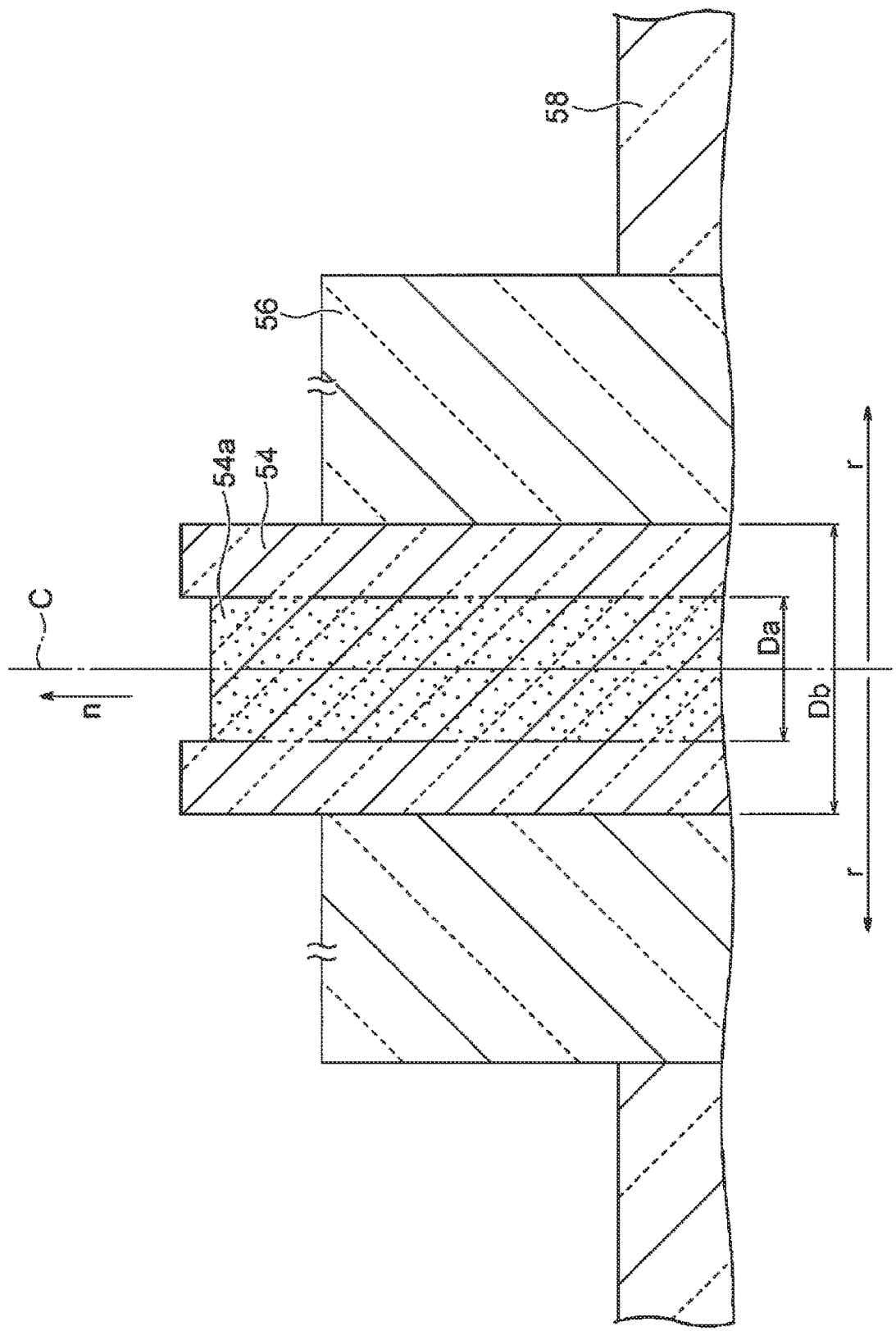

OPTICAL FIBER LASER DEVICE

CROSS-REFERENCE TO RELATED APPLICATION

This application claims priority to Japanese Patent Application No. 2019-087569 filed on May 7, 2019, incorporated herein by reference in its entirety.

BACKGROUND

1. Technical Field

The disclosure relates to optical fiber laser devices.

2. Description of Related Art

Japanese Patent Application Publication No. 2007-273600 (JP 2007-273600 A) describes an optical fiber laser device that outputs laser light. In this optical fiber laser device, optical fibers each having a fiber Bragg grating (FBG) are connected to both ends of a rare earth-doped fiber.

SUMMARY

In the rare earth-doped fiber included in the optical fiber laser device, a rare earth element is uniformly distributed in its entire core. When outputting high intensity laser light using the rare earth-doped fiber in which the rare earth element is uniformly distributed in its entire core, the laser light is not single-mode (unimodal) laser light but multimode laser light with poor condensing properties.

The disclosure relates to a technique for effectively outputting single-mode laser light as compared to the case where a rare earth element is uniformly distributed in the entire core.

An optical fiber laser device according to a first aspect of the disclosure includes: a first fiber having a first fiber Bragg grating; a second fiber having a second fiber Bragg grating with lower reflectance than the first fiber Bragg grating; and a third fiber doped with a rare earth element, having a first end connected with the first fiber, and having a second end connected with the second fiber. A central portion of a core of the third fiber is more heavily doped with the rare earth element than a peripheral portion of the core is.

According to the above configuration, excitation light having entered the first fiber excites the rare earth element added to the core of the third fiber. The excited rare earth element thus spontaneously emits light with a specific wavelength. The spontaneously emitted light enters the second fiber and is reflected by the second fiber Bragg grating.

The light reflected by the second fiber Bragg grating is amplified by the excited rare earth element as it travels back and forth between the first fiber Bragg grating and the second fiber Bragg grating. The amplified light having been amplified and thus having exceeded oscillation conditions passes through the second fiber Bragg grating and is output as laser light.

The central portion of the core is more heavily doped with the rare earth element than the peripheral portion of the core is. Accordingly, the light passing through the central portion of the core is amplified as it travels back and forth between the first fiber Bragg grating and the second fiber Bragg grating a plurality of times. Single-mode laser light is thus output. The optical fiber laser device thus effectively outputs single-mode laser light as compared to the case where the rare earth element is uniformly distributed in the entire core.

In the optical fiber laser device according to the first aspect, the central portion of the core may be doped with the rare earth element, the peripheral portion of the core may not be doped with the rare earth element, and the following expression may be satisfied, where Da represents a diameter of the central portion doped with the rare earth element and Db represents a diameter of the core $$Db/2 \leq Da \leq (3 \cdot Db)/4.$$

According to the above configuration, the degree of amplification of an LP01 mode, which is a single mode, is higher than in the case where the diameter Da of the doped portion is larger than $(3 \cdot Db)/4$ or smaller than $Db/2$. The optical fiber laser device thus effectively outputs single-mode laser light.

In the optical fiber laser device according to the first aspect, the peripheral portion of the core may include an absorbing portion that absorbs light in an output wavelength band.

According to the above configuration, the gain of light that is output from the peripheral portion of the core is reduced as the peripheral portion of the core includes the absorbing portion that absorbs light in the output wavelength band. The optical fiber laser device thus effectively outputs single-mode laser light as compared to the case where the peripheral portion of the core does not include the absorbing portion that absorbs light in the output wavelength band.

In the optical fiber laser device according to the first aspect, the rare earth element may be ytterbium, and the absorbing portion may be samarium-doped quartz.

According to the disclosure, the optical fiber laser device effectively outputs single-mode laser light as compared to the case where the rare earth element is uniformly distributed in the entire core.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a sectional view of a rare earth-doped fiber included in an optical fiber laser device according to a first embodiment of the disclosure;

FIG. 2 is a refractive index distribution diagram showing distribution of the refractive index of the rare earth-doped fiber included in the optical fiber laser device according to the first embodiment of the disclosure;

FIG. 3A is a sectional view of an optical fiber used in the optical fiber laser device according to the first embodiment of the disclosure;

FIG. 3B is a sectional view of the rare earth-doped fiber used in the optical fiber laser device according to the first embodiment of the disclosure;

FIG. 5 is a schematic configuration diagram of the optical fiber laser device according to the first embodiment of the disclosure;

FIG. 6 is a graph showing the analysis results of rare earth-doped fibers of examples included in the optical fiber laser device according to the first embodiment of the disclosure and a rare earth-doped fiber of a comparative example;

FIG. 11A is a sectional view of a rare earth-doped fiber used in an optical fiber laser device according to a second embodiment of the disclosure;

FIG. 11B is an enlarged sectional view of FIG. 11A;

FIG. 12 is a refractive index distribution diagram showing distribution of the refractive index of the rare earth-doped fiber included in the optical fiber laser device according to the second embodiment of the disclosure;

FIG. 13 is a schematic configuration diagram of the optical fiber laser device according to the second embodiment of the disclosure;

FIG. 14 is a refractive index distribution diagram showing distribution of the refractive index of a rare earth-doped fiber included in an optical fiber laser device according to a modification of the embodiment of the disclosure;

FIG. 15 is a refractive index distribution diagram showing distribution of the refractive index of a rare earth-doped fiber included in an optical fiber laser device according to a modification of the embodiment of the disclosure.

DETAILED DESCRIPTION OF EMBODIMENTS

First Embodiment

Figure 4A:
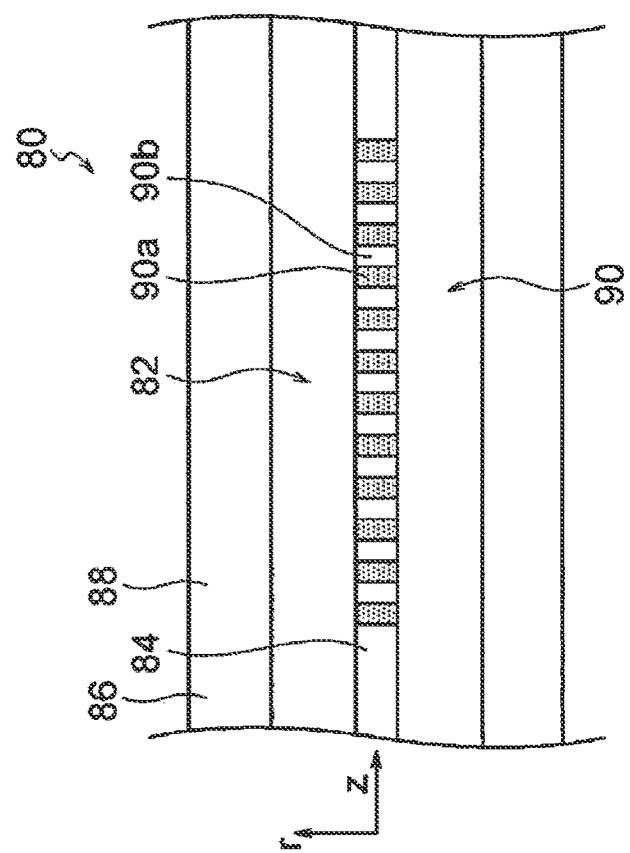
FIG. 4A is a sectional view of a first FBG formed in the optical fiber used in the optical fiber laser device according to the first embodiment of the disclosure.

An example of an optical fiber laser device according to a first embodiment of the disclosure will be described with reference to FIGS. 1 to 10. Arrow H shown in the figures indicates the up-down direction of the device (vertical direction), and arrow W shown in the figures indicates the lateral direction of the vehicle (horizontal direction).

Overall Configuration

As shown in FIG. 5, an optical fiber laser device 10 includes an excitation light source 20 that outputs excitation light in a predetermined wavelength band, an optical fiber 30 with a first fiber Bragg grating 32 (hereinafter referred to as the "first FBG 32"), and a rare earth-doped fiber 50. The optical fiber laser device 10 further includes an optical fiber 80 with a second fiber Bragg grating 82 (hereinafter referred to as the "second FBG 82").

The excitation light source 20, the optical fiber 30, the rare earth-doped fiber 50, and the optical fiber 80 are arranged in this order from one side to the other side in the lateral direction of the device. The optical fiber 30 is an example of the first fiber, and the optical fiber 80 is an example of the second fiber.

Excitation Light Source 20

The excitation light source 20 is, e.g., a semiconductor laser etc. As shown in FIG. 5, the excitation light source 20 is disposed so as to face one end of the optical fiber 30. The excitation light source 20 outputs excitation light toward the one end of the optical fiber 30. In the present embodiment, the excitation light source 20 outputs, e.g., excitation light with a wavelength of 975 nm.

Optical Fiber 30 and Optical Fiber 80

Optical Fiber 30

As shown in FIG. 5, the optical fiber 30 is linearly disposed such that its one end faces the excitation light source 20 and that the optical fiber 30 extends in the lateral direction of the device. The optical fiber 30 has its one end fused to the excitation light source 20. As shown in FIG. 3A, the optical fiber 30 has a core 34, a cladding 36 covering the core 34, and a resin cladding 38 covering the cladding 36.

The refractive index of the cladding 36 is lower than that of the core 34, and the refractive index of the resin cladding 38 is significantly lower than that of the cladding 36. The core 34 is made of quartz doped with germanium, phosphorus, or aluminum, and the cladding 36 is made of quartz not doped with any dopant. The resin cladding 38 is made of an ultraviolet curable resin.

In the present embodiment, the core 34 has a diameter of 40 μm, the cladding 36 has a diameter of 400 μm, and the resin cladding 38 has a diameter of 800 μm.

As shown in FIG. 4A, the first FBG 32 formed in the optical fiber 30 has a diffraction grating 40. The diffraction grating 40 has high refractive index portions 40a and low refractive index portions 40b in the core 34 of the optical fiber 30. The high refractive index portions 40a are arranged at regular intervals in the longitudinal direction of the optical fiber 30 and have a higher refractive index than the core 34. Each of the low refractive index portions 40b is located between a pair of high refractive index portions 40a and has the same refractive index as the core 34. The left-right direction in FIGS. 4A and 4B (arrow z in the figures) indicates the longitudinal direction of the fiber, and the up-down direction in FIGS. 4A and 4B (arrow r in the figures) indicates the radial direction of the fiber.

In the present embodiment, the reflection center wavelength (Bragg wavelength) of light reflected by the first FBG 32 is, e.g., 1080 nm. The dimensions of each part, physical property values, etc. are determined so that the first FBG 32 reflects light with reflectance of 99% or more.

Optical Fiber 80

As shown in FIG. 5, the optical fiber 80 is linearly disposed so as to extend in the lateral direction of the device. As shown in FIG. 3A, the optical fiber 80 has a core 84, a cladding 86 covering the core 84, and a resin cladding 88 covering the cladding 86.

Each member of the optical fiber 80 has a diameter similar to that of each member of the optical fiber 30 and is made of a material similar to that of each member of the optical fiber 30.

Figure 4B:
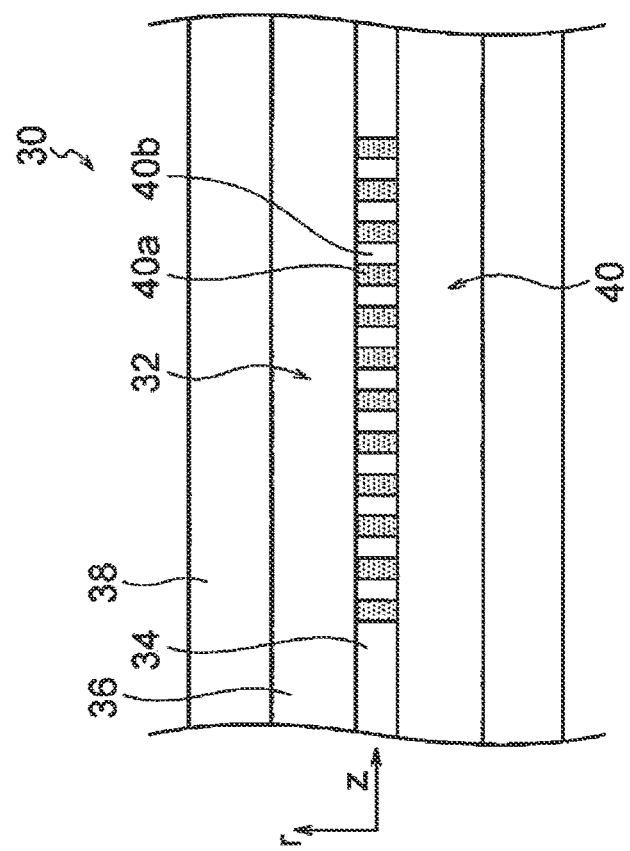
FIG. 4B is a sectional view of a second FBG formed in the optical fiber used in the optical fiber laser device according to the first embodiment of the disclosure.

As shown in FIG. 4B, the second FBG 82 formed in the optical fiber 80 has a diffraction grating 90. The diffraction grating 90 has high refractive index portions 90a and low refractive index portions 90b in the core 84 of the optical fiber 80. The high refractive index portions 90a are arranged at regular intervals in the longitudinal direction of the optical fiber 80 and have a higher refractive index than the core 84.

Each of the low refractive index portions 90b is located between a pair of high refractive index portions 90a and has the same refractive index as the core 84.

In the present embodiment, the reflection center wavelength (Bragg wavelength) of light reflected by the second FBG 82 is, e.g., 1080 nm like the first FBG 32. The reflectance of light reflected by the second FBG 82 is lower than that of light reflected by the first FBG 32. For example, in the present embodiment, the dimensions of each part, physical property values, etc. are determined so that the second FBG 82 reflects light with reflectance of 10%.

Rare Earth-Doped Fiber 50

As shown in FIG. 5, the rare earth-doped fiber 50 is disposed between the optical fiber 30 and the optical fiber 80 in the lateral direction of the device. The rare earth-doped fiber 50 is wound in a coil shape with a large diameter so that no stress is produced in the rare earth-doped fiber 50.

As shown in FIG. 3B, the rare earth-doped fiber 50 has a core 54 doped with a rare earth element, a cladding 56 covering the core 54, and a resin cladding 58 covering the cladding 56.

The refractive index of the cladding 56 is lower than that of the core 54, and the refractive index of the resin cladding 58 is significantly lower than that of the cladding 56. The core 54 is made of quartz doped with ytterbium (Yb) that is an example of the rare earth element, and the cladding 56 is made of quartz not doped with any dopant. The resin cladding 58 is made of an ultraviolet curable resin. The core 54 doped with the rare earth element will be described in detail later.

In the present embodiment, the core 54 has a diameter of 40 μm, the cladding 56 has a diameter of 400 μm, and the resin cladding 58 has a diameter of 500 μm. The rare earth-doped fiber 50 has a length of 9 m or more.

The rare earth-doped fiber 50 has its one end fused to the other end of the optical fiber 30 by arc discharge machining (see FIG. 5). Specifically, the core 34 and the cladding 36 of the optical fiber 30 and the core 54 and the cladding 56 of the rare earth-doped fiber 50 are fused together by arc discharge (see FIGS. 3A and 3B).

The other end of the rare earth-doped fiber 50 is fused to one end of the optical fiber 80 by arc discharge machining (see FIG. 5). Specifically, the core 84 and the cladding 86 of the optical fiber 80 and the core 54 and the cladding 56 of the rare earth-doped fiber 50 are fused together by arc discharge (see FIGS. 3A and 3B).

Configuration of Main Part

Next, the core 54 doped with the rare earth element will be described with reference to FIGS. 1 and 2. FIG. 1 shows a section of the rare earth-doped fiber 50 taken in a direction perpendicular to the longitudinal direction of the rare earth-doped fiber 50. FIG. 2 is a refractive index distribution diagram showing distribution of the refractive index of the rare earth-doped fiber 50. The up-down direction in FIG. 2 (arrow n in the figure) indicates the level of the refractive index, and the greater the height in the figure is, the higher the refractive index is. The left-right direction in FIG. 2 (arrow r in the figure) indicates the radial direction of the rare earth-doped fiber 50. The dimensional ratios in the figures are exaggerated for convenience of description and may be different from the actual dimensional ratios.

As described above, the core 54 of the rare earth-doped fiber 50 is made of quartz doped with the rare earth element and has a diameter of 40 μm.

As shown in FIGS. 1 and 2, the central portion of the core 54 is doped with the rare earth element as viewed in the longitudinal direction of the rare earth-doped fiber 50, and a portion 54a doped with the rare earth element has a circular section. The doped portion 54a is shaded with dots in the figure.

The "central portion of the core 54" herein refers to a portion that includes the center C of the core 54 and is located away from the cladding 56 as viewed in the longitudinal direction of the rare earth-doped fiber 50.

In the present embodiment, the portion 54a doped with the rare earth element is a cylindrical portion concentric with the core 54 and having a predetermined diameter Da of 20 μm or more and 30 μm or less. In other words, the portion 54a doped with the rare earth element is a cylindrical portion with a predetermined diameter Da of Db/2 or more and (3·Db)/4 or less, where Db represents the diameter of the core 54. As described above, in the present embodiment, the central portion of the core 54 is more heavily doped with the rare earth element than the peripheral portion of the core 54 is.

The doped portion 54a is doped with the rare earth element at a predetermined concentration in the range of 0.5 mass % or more and 10 mass % or less. The concentration of the rare earth element is preferably high in order for the rare earth element to be excited and spontaneously emit light with a specific wavelength and is preferably low in order for the doped portion 54a to have a uniform concentration of the rare earth element. The doped portion 54a is therefore preferably doped with the rare earth element at the concentration of 1 mass % or more and 2 mass % or less.

The portion 54a of the core 54 which is doped with the rare earth element can be specified by analysis using an electron probe micro analyzer (EPMA).

Functions

Next, functions of the optical fiber laser device 10 will be described by comparison with an optical fiber laser device 510 according to a comparative form. First, the configuration of the optical fiber laser device 510 will be described mainly with respect to differences from the optical fiber laser device 10. Functions of the optical fiber laser device 510 will also be described mainly with respect to differences from the optical fiber laser device 10.

Configuration of Optical Fiber Laser Device 510

Figure 10:
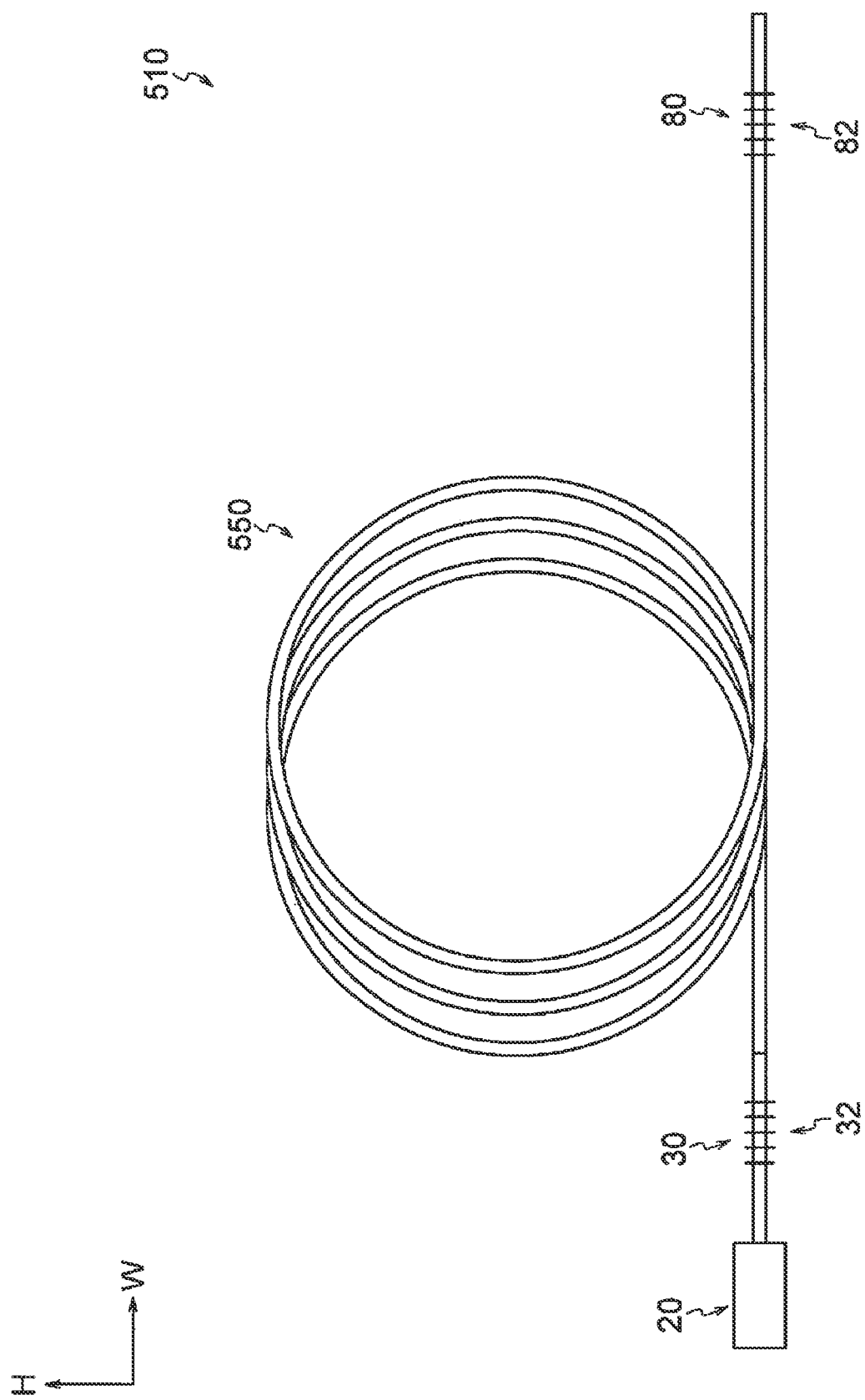
FIG. 10 is a schematic configuration diagram of the optical fiber laser device according to the comparative form for the first embodiment of the disclosure.

As shown in FIG. 10, the optical fiber laser device 510 includes the excitation light source 20, the optical fiber 30, a rare earth-doped fiber 550, and the optical fiber 80. The rare earth-doped fiber 550 is disposed between the optical fiber 30 and the optical fiber 80 in the lateral direction of the device. The rare earth-doped fiber 550 is wound in a coil shape with a large diameter so that no stress is produced in the rare earth-doped fiber 550.

Figure 9A:
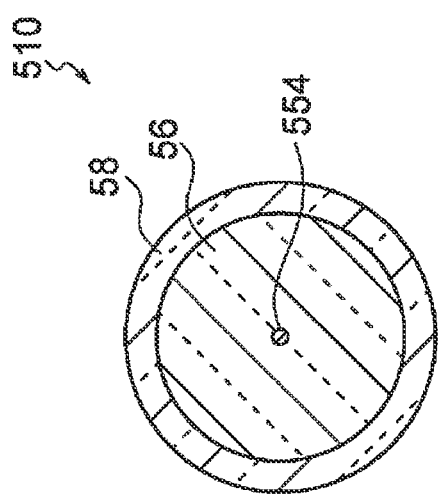
FIG. 9A is a sectional view of a rare earth-doped fiber used in an optical fiber laser device according to a comparative form for the first embodiment of the disclosure.
Figure 9B:
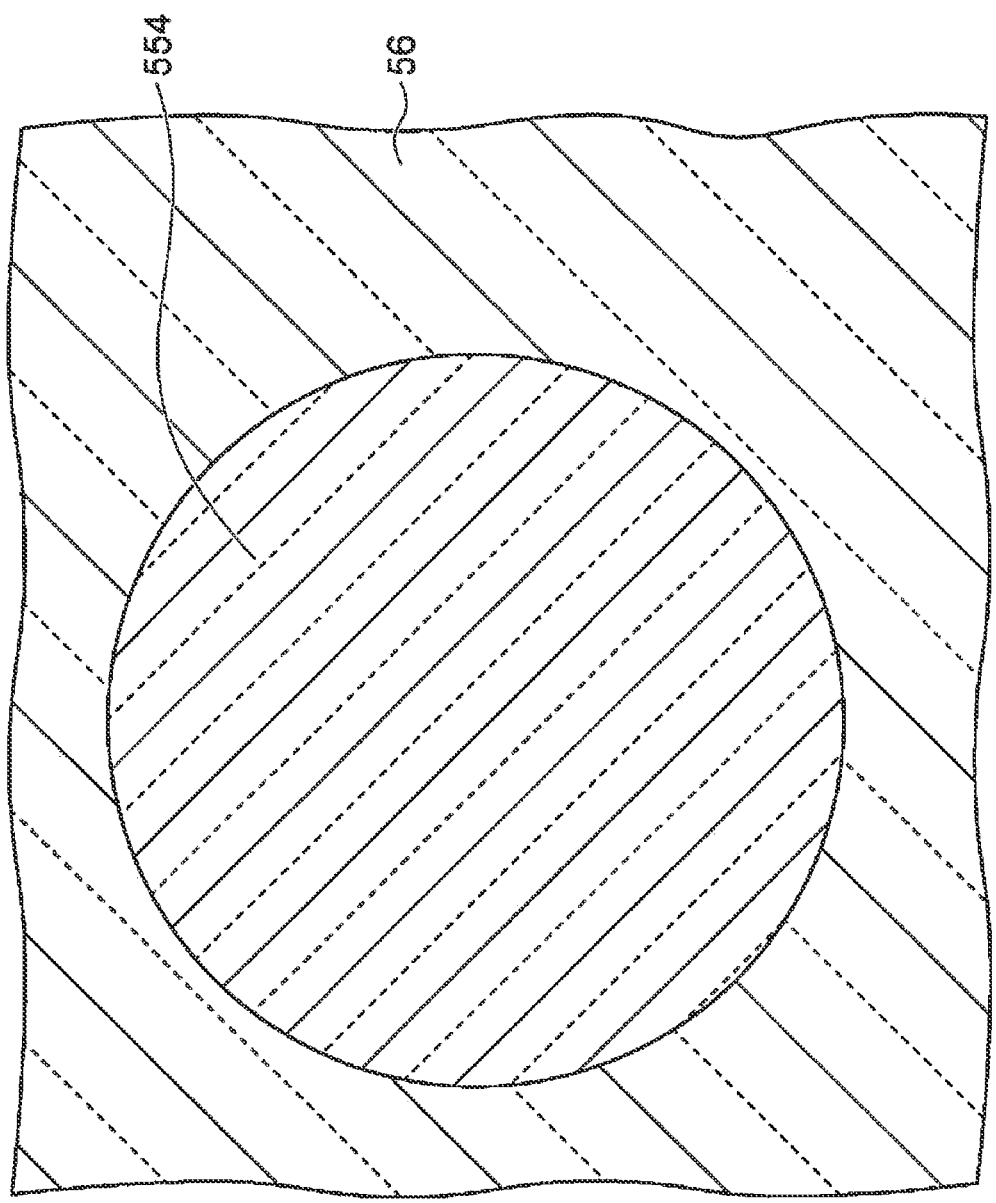
FIG. 9B is an enlarged sectional view of FIG. 9A.

As shown in FIG. 9A, the rare earth-doped fiber 550 has a core 554 doped with a rare earth element, the cladding 56 covering the core 554, and the resin cladding 58 covering the cladding 56. The core 554 is made of quartz doped with the rare earth element and has a diameter of 40 μm. The entire core 554 is uniformly doped with the rare earth element. In other words, the rare earth element is uniformly distributed in the entire core 554. In the present embodiment, the core 554 is doped with the rare earth element at the concentration of 0.5 mass % or more and 10 mass % or less.

Analysis of Oscillation Modes

The rare earth-doped fibers 50, 550 were analyzed by simulation for the degree of amplification of each oscillation mode. This analysis will be described below.

First, the oscillation modes will be described. The following four oscillation modes were used in this analysis: LP01 mode, LP02 mode, LP03 mode, and LP04 mode.

FIGS. 7A, 7B, 8A, and 8B are graphs in which the X-axis and the Y-axis are coordinate axes indicating the position in a section of the core and the Z-axis represents radiant intensity.

Figure 7B:
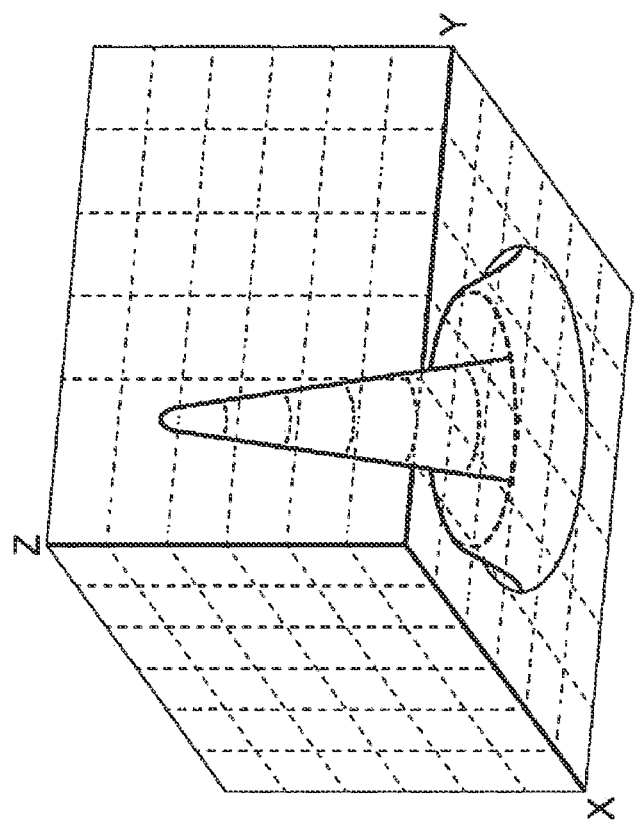
FIG. 7B illustrates an oscillation mode of laser light in the optical fiber laser device according to the first embodiment of the disclosure.
Figure 7A:
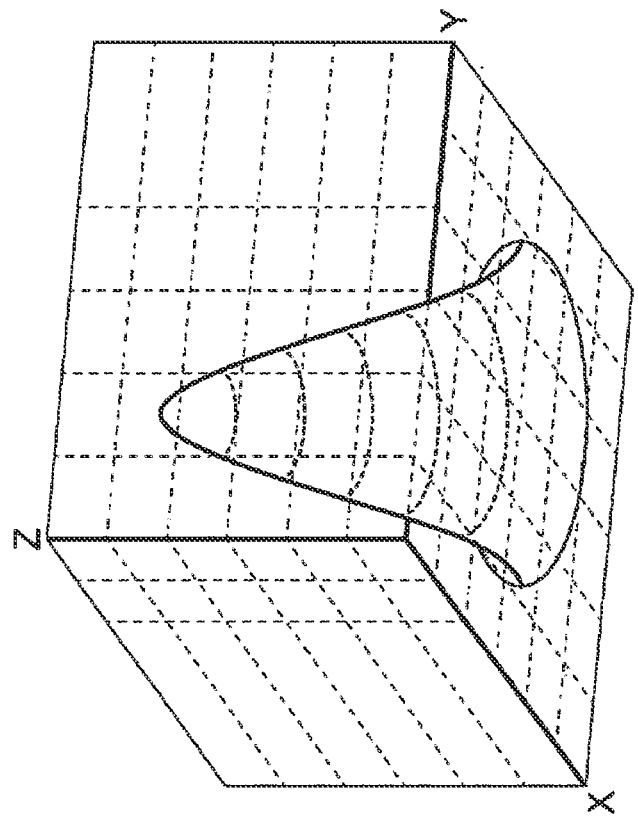
FIG. 7A illustrates an oscillation mode of laser light in the optical fiber laser device according to the first embodiment of the disclosure.

As shown in FIG. 7A, the LP01 mode is a single mode (unimodal) in which the output is the highest at the center of the core and an extreme value, namely the output higher than at surrounding locations, appears at one location. As shown in FIG. 7B, the LP02 mode is a multi-mode in which the output is the highest at the center of the core and extreme values, namely the output higher than at surrounding locations, appear in a circle pattern around the center of the core.

Figure 8B:
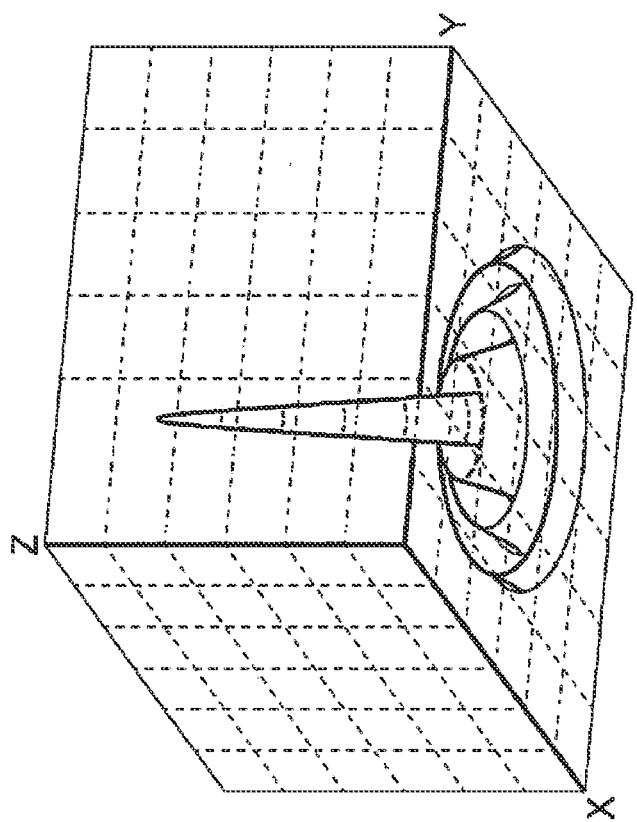
FIG. 8B illustrates an oscillation mode of laser light in the optical fiber laser device according to the first embodiment of the disclosure.
Figure 8A:
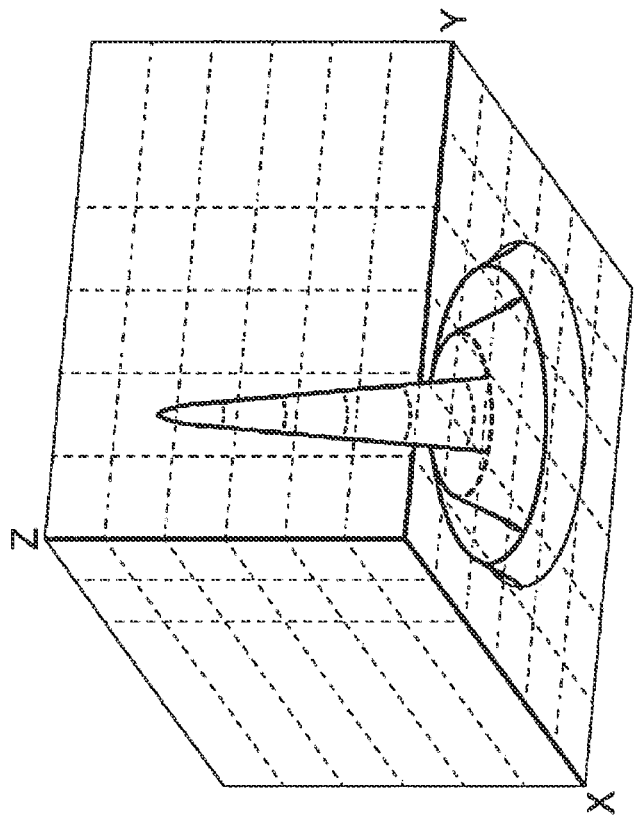
FIG. 8A illustrates an oscillation mode of laser light in the optical fiber laser device according to the first embodiment of the disclosure.

As shown in FIG. 8A, the LP03 mode is a multi-mode in which the output is the highest at the center of the core and extreme values, namely the output higher than at surrounding locations, appear in a double-circle pattern around the center of the core. As shown in FIG. 8B, the LP04 mode is a multi-mode in which the output is the highest at the center of the core and extreme values, namely the output higher than at surrounding locations, appear in a triple-circle pattern around the center of the core.

Analysis Specifications

1. The rare earth-doped fiber 50 in which the portion 54*a* concentric with the core 54 and having a diameter of 20 μm was doped with the rare earth element was used as Example 1.

2. The rare earth-doped fiber 50 in which the portion 54*a* concentric with the core 54 and having a diameter of 25 μm was doped with the rare earth element was used as Example 2.

3. The rare earth-doped fiber 50 in which the portion 54*a* concentric with the core 54 and having a diameter of 30 μm was doped with the rare earth element was used as Example 3.

4. The rare earth-doped fiber 550 in which the entire core 554 was uniformly doped with the rare earth element was used as a comparative example.

Analysis Results

FIG. 6 is a graph in which the abscissa represents the oscillation mode and the ordinate represents the degree of amplification of the oscillation mode (hereinafter sometimes simply referred to as the "degree of amplification"). The continuous line in the graph indicates the analysis results of Example 1, the long dashed short dashed line in the graph indicates the analysis results of Example 2, and the long dashed double-short dashed line in the graph indicates the analysis results of Example 3. The dashed line in the graph indicates the analysis results of the comparative example.

As shown in the graph of FIG. 6, the degrees of amplification of the LP01 mode, the LP02 mode, the LP03 mode, and the LP04 mode were similar in the comparative example. That is, all the modes were amplified to the same degree in the comparative example.

For Examples 1, 2, and 3, as shown in the graph of FIG. 6, the degree of amplification of the LP01 mode was higher than the degrees of amplification of the other oscillation modes. The amplification ratio herein refers to the ratio of the degree of amplification of the LP01 mode to the degree of amplification of the LP02 mode. The amplification ratio of the first embodiment is 1.4, the amplification ratio of the second embodiment is 1.6, and the amplification ratio of the third embodiment is 1.2. The amplification ratio of the comparative example is 1.0.

That is, the amplification ratio is the highest when the diameter of the portion doped with the rare earth element is 25 μm, and the amplification ratio becomes lower when the diameter of the portion doped with the rare earth element is larger or smaller than 25 μm. That is, the amplification ratio is the highest when the diameter Da of the portion doped with the rare earth element is (5·Db)/8, and the amplification ratio becomes lower when the diameter Da of the portion doped with the rare earth element is larger or smaller than (5·Db)/8, where Db represents the diameter of the core 54. Based on the knowledge that the degree of amplification of each oscillation mode changes according to the ratio between the diameter of the core and the diameter of the portion doped with the rare earth element, the portion doped with the rare earth element was nondimensionalized.

Consideration for Analysis Results

In the comparative example, the entire core 554 is uniformly doped with the rare earth element, as described above. It is therefore considered that the degree of amplification of each oscillation mode is similar.

In Examples 1, 2 and 3, the central portion of the core 54 is doped with the rare earth element, as described above. It is therefore considered that the degree of amplification of the LP01 mode is higher than the degrees of amplification of the other oscillation modes.

Functions of Optical Fiber Laser Devices 10, 510

Next, functions of the optical fiber laser devices 10, 510 will be described.

The excitation light source 20 shown in FIGS. 5 and 10 emits excitation light with a wavelength of 975 nm toward the one end of the optical fiber 30. This excitation light enters the cladding 36 and the core 34 of the optical fiber 30 (see FIG. 3A). The excitation light having propagated through the optical fiber 30 enters the rare earth-doped fiber 50, 550.

The excitation light having entered the rare earth-doped fiber 50, 550 is absorbed by the rare earth element added to the core 54, 554 of the rare earth-doped fiber 50, 550. The rare earth element is thus excited, and the excited rare earth element spontaneously emits light with a specific wavelength. The spontaneously emitted light having propagated through the core 54, 554 of the rare earth-doped fiber 50, 550 (see FIG. 3B) enters the optical fiber 80.

Of the spontaneously emitted light having entered the optical fiber 80, light in the reflection wavelength band (1080 nm in the present embodiment) of the second FBG 82 is reflected by the second FBG 82. The light reflected by the second FBG 82 returns to the rare earth-doped fiber 50, 550.

The light having returned to the rare earth-doped fiber 50, 550 is amplified by stimulated emission of the rare earth element. The amplified light then enters the optical fiber 30.

Of the light having entered the optical fiber 30, light in the reflection wavelength band of the first FBG 32 (1080 nm in the present embodiment) is reflected by the first FBG 32. The light reflected by the first FBG 32 returns to the rare earth-doped fiber 50, 550. The light having returned to the rare earth-doped fiber 50, 550 is amplified by stimulated emission of the rare earth element. The amplified light then enters the optical fiber 80.

As described above, the propagating light is gradually amplified as it travels back and forth between the first FBG 32 and the second FBG 82. The light having exceeded oscillation conditions passes through the second FBG 82 and is output as laser light from the optical fiber laser device 10, 510.

In the optical fiber laser device 510, the entire core 554 is uniformly doped with the rare earth element. The degree of amplification of each oscillation mode is therefore similar, as described with respect to the above analysis results. Accordingly, it is difficult to selectively output single-mode laser light even when light travels back and forth between the first FBG 32 and the second FBG 82 a plurality of times.

In the optical fiber laser device 10, on the other hand, the central portion of the core 54 is doped with the rare earth element. The degree of amplification of the LP01 mode is therefore higher than the degrees of amplification of the other oscillation modes, as described with respect to the above analysis results.

Accordingly, light of the LP01 mode is amplified more than light of the other oscillation modes as light travels back and forth between the first FBG 32 and the second FBG 82 a plurality of times. Laser light of the LP01 mode is thus output from the optical fiber laser device 10. In other words, single-mode laser light is output from the optical fiber laser device 10.

Summary

As described above, the optical fiber laser device 10 efficiently outputs single-mode laser light as compared to the optical fiber laser device 510 in which the entire core 554 is uniformly doped with the rare earth element.

In other words, the optical fiber laser device 10 outputs laser light with better condensing properties as compared to the optical fiber laser device 510 in which the entire core 554 is uniformly doped with the rare earth element.

In the optical fiber laser device 10, the diameter Da of the portion doped with the rare earth element satisfies the following expression, where Db represents the diameter of the core 54.

$$Db/2 \leq Da \leq (3 \cdot Db)/4$$

Accordingly, the optical fiber laser device 10 effectively outputs single-mode laser light as compared to the case where the diameter Da is larger than $(3 \cdot Db)/4$ or smaller than $Db/2$.

Second Embodiment

An example of an optical fiber laser device according to a second embodiment of the disclosure will be described with reference to FIGS. 11A to 13. The second embodiment will be described mainly with respect to differences from the first embodiment.

As shown in FIG. 13, an optical fiber laser device 210 according to the second embodiment includes the excitation light source 20, the optical fiber 30, a rare earth-doped fiber 250, and the optical fiber 80. The rare earth-doped fiber 250 is disposed between the optical fiber 30 and the optical fiber 80 in the lateral direction of the device. The rare earth-doped fiber 250 is wound in a coil shape with a large diameter so that no stress is produced in the rare earth-doped fiber 250.

As shown in FIG. 11A, the rare earth-doped fiber 250 has a core 254 doped with a rare earth element, the cladding 56 covering the core 254, and the resin cladding 58 covering the cladding 56.

As described above, the core 254 is made of quartz doped with the rare earth element and has a diameter of 40 μm. Specifically, as shown in FIGS. 11B and 12, the central portion of the core 254 is doped with the rare earth element, and a portion 254a doped with the rare earth element has a circular section. Specifically, the portion 254a doped with the rare earth element is a cylindrical portion concentric with the core 54 and having a predetermined diameter Da of 20 μm or more and 30 μm or less.

The core 254 has an absorbing portion 254b in the peripheral portion of the core 254. The absorbing portion 254b is formed in a portion different from the doped portion 54a and absorbs light in a wavelength band to be output without the absorbing excitation light. The absorbing portion 254b is formed along the entire circumference of the core 254. For example, when the wavelength of excitation light is 975 nm and the rare earth element is ytterbium (Yb), the absorbing portion 254b is a hollow cylindrical portion made of samarium (Sm)-doped quartz and absorbs about 20% of light in the output wavelength band as compared to the remaining portion of the core 254.

Since the absorbing portion 254b that absorbs light in the output wavelength band is formed in the peripheral portion of the core 254, light that is output from the peripheral portion of the core 254 has reduced radiant intensity. The optical fiber laser device 210 thus efficiently outputs single-mode laser light as compared to the case where the core 254 does not have the absorbing portion 254b.

The other functions of the second embodiment are the same as the functions of the first embodiment.

Although the disclosure is described above in detail with respect to the specific embodiments, the disclosure is not limited to such embodiments, and various other embodiments are possible within the spirit and scope of the disclosure. For example, in the first and second embodiments, the central portion of the core 54, 254 is doped with the rare earth element, and the peripheral portion of the core 54, 254 is not doped with the rare earth element. However, the peripheral portion of the core may be doped with the rare earth element. The central portion of the core 54, 254 need only be more heavily doped with the rare earth element than the peripheral portion of the core 54, 254 is.

In the first and second embodiments, the portions 54a, 254a doped with the rare earth element have a circular section. However, the doped portions 54a, 254a may have other shapes in section such as a rectangular section. The doped portions 54a, 254a need only be located away from the cladding 56. In this case, the function that is implemented by the doped portions 54a, 254a having a circular section is not implemented.

In the first and second embodiments, the cores 54, 254 of the rare earth-doped fibers 50, 250 are doped with ytterbium (Yb). However, the rare earth element may be erbium (Er), dysprosium (Dy), or thulium (Tm) when, e.g., a gallium nitride (GaN) semiconductor laser having a wavelength in the 400 nm band etc. is used as the excitation light source 20.

In the second embodiment, the absorbing portion 254b is doped with samarium (Sm). However, the absorbing portion 254b may be doped with europium (Eu) etc. depending on the wavelength of laser light to be absorbed by the absorbing portion 254b.

Although not particularly described in the first embodiment, the doped portion 54a may have a higher refractive index than the core 54 except for the doped portion 54a as shown in FIG. 14 or may have a lower refractive index than the core 54 except for the doped portion 54a as shown in FIG. 15.

Figure 16:
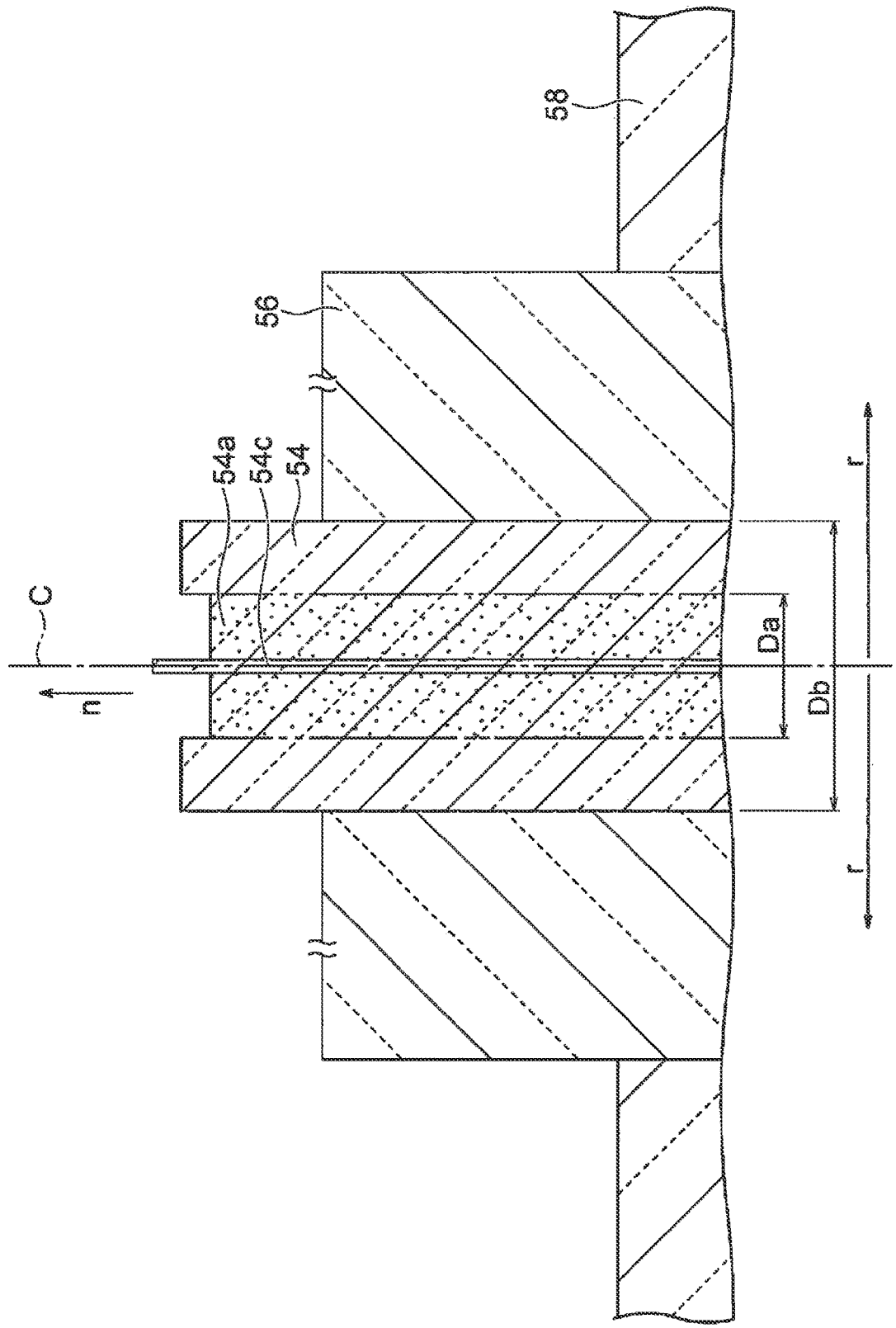
FIG. 16 is a refractive index distribution diagram showing distribution of the refractive index of a rare earth-doped fiber included in an optical fiber laser device according to a modification of the embodiment of the disclosure.

Although not particularly described in the first embodiment, the doped portion 54a may have a lower refractive index than the core 54 except for the doped portion 54a as shown in FIG. 16. A cylindrical central portion 54c, which is the center of the core 54 and has a diameter of 1 μm or more and 2 μm or less, is not doped with a rare earth element and has a higher refractive index than the doped portion 54a. The central portion 54c may have a higher refractive index than the portion of the core 54 which is not doped with a rare earth element. The central portion of the core 54 need only be more heavily doped with the rare earth element than the peripheral portion of the core 54 is.

What is claimed is:

1. An optical fiber laser device, comprising:
a first fiber having a first fiber Bragg grating;
a second fiber having a second fiber Bragg grating with lower reflectance than the first fiber Bragg grating; and
a third fiber having a core that includes a central portion and a peripheral portion doped with a rare earth element, the third fiber having a first end connected with the first fiber and having a second end connected with the second fiber, wherein
the central portion of the core of the third fiber is more heavily doped with the rare earth element than the peripheral portion of the core is.

2. The optical fiber laser device according to claim 1, wherein
a following expression is satisfied, where Da represents a diameter of the central portion doped with the rare earth element and Db represents a diameter of the core, and $$Db/2 \leq Da \leq (3 \cdot Db)/4.$$

3. The optical fiber laser device according to claim 1, wherein the peripheral portion of the core includes an absorbing portion that absorbs light in an output wavelength band.

4. The optical fiber laser device according to claim 3, wherein:
the rare earth element is ytterbium; and
the absorbing portion is samarium-doped quartz.

5. The optical fiber laser device according to claim 1, wherein the central portion of the core of the third fiber is doped with the rare earth element at a concentration ranging from 0.5 mass % to 10 mass %.

6. The optical fiber laser device according to claim 1, wherein the central portion of the core of the third fiber is doped with the rare earth element at a concentration ranging from 1 mass % to 2 mass %.

* * * * *